United States Patent [19]
Agestam et al.

[11] Patent Number: 5,512,885
[45] Date of Patent: Apr. 30, 1996

[54] CONTROL OF DATA COMMUNICATION IN NETWORKS WITH CLOSED USER GROUPS

[75] Inventors: Lennart Agestam, Göteborg, Sweden; Henry Hellered, Chavenay, France; Hans Ågårdh, Göteborg, Sweden

[73] Assignee: Telefonaktiebolaget LM Ericsson, Stockholm, Sweden

[21] Appl. No.: 136,700

[22] Filed: Oct. 15, 1993

[30] Foreign Application Priority Data

Oct. 16, 1992 [SE] Sweden ................................. 9203054

[51] Int. Cl.$^6$ ................................................. H04L 12/22
[52] U.S. Cl. ............................. 340/825.52; 340/825.47; 379/59; 455/33.1
[58] Field of Search ..................... 340/825.47, 825.52; 379/63, 57, 59; 455/33.1, 34.1, 54.2

[56] References Cited

U.S. PATENT DOCUMENTS

| 4,093,819 | 6/1978 | Saito et al. | |
|---|---|---|---|
| 5,323,446 | 6/1994 | Kojima et al. | 379/59 |

FOREIGN PATENT DOCUMENTS

| 2238212 | 5/1991 | United Kingdom . |
|---|---|---|

OTHER PUBLICATIONS

CCITT, Data Communication Networks; Services and Facilities, Interfaces vol. VIII; Nov. 1988.

S. Brutzkus et al., "An Evaluation of Schemes for Implementing Closed User Groups in Public Data Networks," Proceedings of the Pacific Telecommunications Conference, pp. 2A-1 to 2A-10, Honolulu, HI (Jan. 8-9, 1979).

Primary Examiner—Michael Horabik
Attorney, Agent, or Firm—Burns, Doane, Swecker & Mathis

[57] ABSTRACT

A method for supervising and controlling the information transfer between two or more categories of users of a data network with closed user groups. Users, belonging to a first category of users, constitute, together with a number of users belonging to other categories, a special closed user group. Within this group, the users belonging to the first category are given a certain first identity, whilst users, belonging to other categories of users, are given a certain second identity, different from the first identity. Transfer of information is only allowed firstly between users with the first identity and users with the second identity and secondly between users who belong to the same closed user group.

3 Claims, 3 Drawing Sheets

CONTROL OF DATA COMMUNICATION IN NETWORKS WITH CLOSED USER GROUPS

BACKGROUND

The present invention relates to a method of allowing the control of the information transfer, in a data network with closed user groups, between two or more categories of users of the data network.

Different types of data networks are used for information transfer. The structure of the networks varies and is adapted to the field of application. An example of such a network will therefore be described in the following.

For information transfer between mobile units, e.g. vehicles, the information is transferred from terminals in the vehicles via a radio communication link to stationary base stations. These are in turn connected, via permanent circuits, to processor controlled exchanges which process and control the information flow. The exchanges are connected to each other and with possible stationary terminals via a permanent circuit network. Normally the exchanges also are connected to a central control station for the network, which monitors and administrates the operation of the exchanges.

In principle, if no special precautions are taken, all of the users connected to the network can reach all other users. When a network can be used by private persons as well as different companies, police, rescue services etc, this might be unsuitable for various reasons.

This problem has been solved by a system with so-called Closed User Groups (CUG). By identifying a number of users as belonging to a certain closed user group, the exchanges of the network can be controlled in such a way that a user can only have communication with the other users in the group. As every user may be allowed to be part of several closed user groups it is however possible to communicate between the groups. The system is well-known and standardized e.g. by means of international telecommunication standards such as CCITT X.25.

However, a problem arises with this system in the case where different categories of users within the closed user groups should be able to communicate with a category of users which is not part of the closed user groups. An example of such a category of users is public services, i.e. services which should be available to all network users. Electronic mail, which is a service for transfer of messages, is such a public service.

As these categories of users or services must be localized outside of the existing closed user groups, the system effectively prevents them from being reached by the group members. In circuit-switched data network with the possibility of virtual circuit-switched connections between different users, the problem may be solved by letting one user be open only for incoming or only for outgoing traffic. Users of, for example, a public service are then only given the possibility of outgoing traffic to the special closed user group which is attached to the service in question. As the network uses virtual circuit-switched connections, a complete dialogue may be made as soon as the connection has been established.

In networks lacking this type of connection which is the case in networks intended for transmission of datagrams, or packets, this possibility does not exist as the connection only operates in one direction.

SUMMARY

The object of the present invention is therefore to provide a method by which different categories of users in a data network having closed user groups have the possibility of communicating with other categories of users outside the closed user groups in a simple and safe manner without, in that way, allowing the possibility of prohibited contacts between the groups. By this method said object can also be achieved in datagram networks.

In one aspect of the invention, there is provided a method for controlling information transfer between two categories of users of a data network that has closed user groups. As one step of the method, users who belong to a first category and users who belong to other categories are assigned to a special user group. The first-category users in the special group are given a predetermined first identity, or tag. The other-category users in the special group are given predetermined second identities, or tags, that are different from the first identity. Information transfer is permitted only between either users having different identities or users who belong to the same closed user group. In other aspects of the invention, the first category of users may include public services, and the data network may be one in which information is transferred as datagrams, or packets.

DESCRIPTION OF DRAWINGS

The invention will now be described in more detail by way of an example and with reference to the accompanying drawings in which.

DETAILED DESCRIPTION

Figure 1:
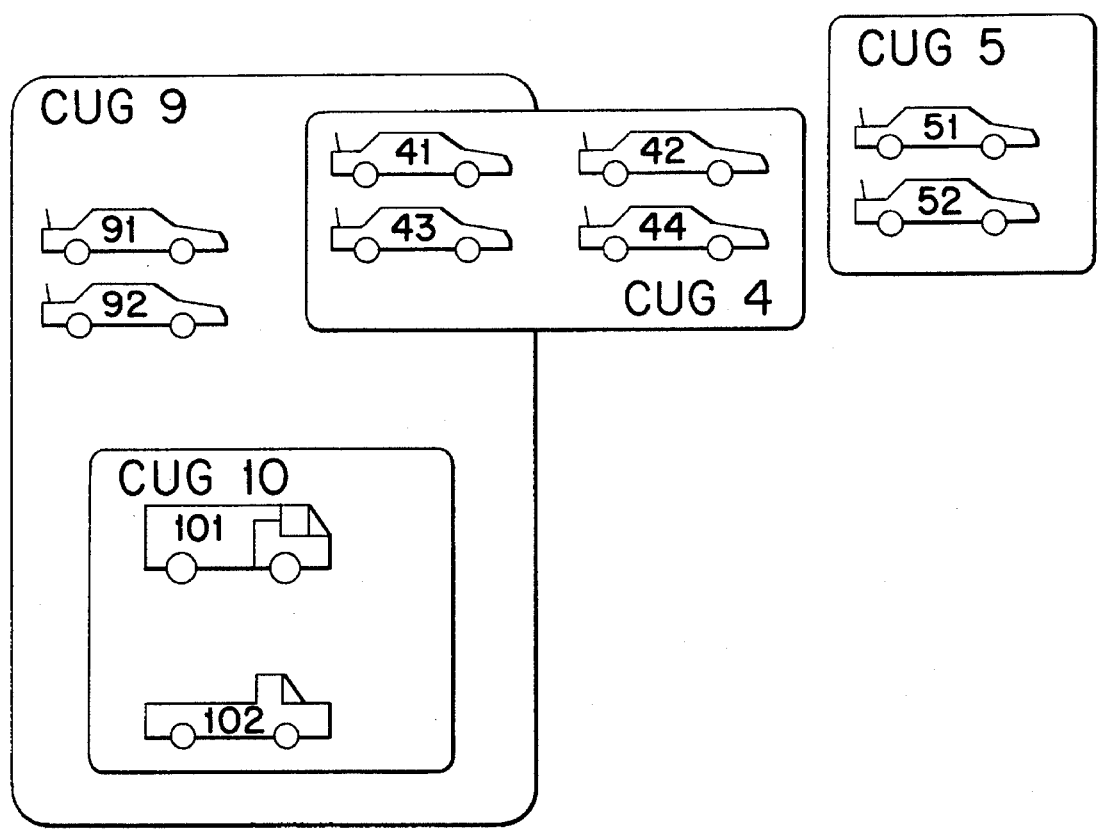
FIG. 1 shows the principal structure of the closed user groups and FIG. 2 shows an example where the invention has been applied to closed user groups.

FIG. 1 shows, in a simplified way, an example of the use of closed user groups in a data network which is here assumed to be intended for transmission of datagrams between mobile units. The reference CUG 5 represents such a group. The members of the group, in the figure indicated as vehicle symbols, are denoted 51 and 52. In a corresponding way the group CUG 4 consists of the members 41–44 and the group CUG 10 of the members 101 and 102. The group CUG 9 includes the members 91 and 92 but in addition also 41 and 43 from the group CUG 4 and 101 and 102 from the group CUG 10, which members accordingly have double group membership.

As mentioned earlier, the contacts between the group members are arranged by the data network to which the users are connected. The network will only allow contacts between users who have at least one group membership in common. This means that, in the example according to FIG. 1, the members 51 and 52 can only communicate with each other because they only belong to the closed user group CUG 5. The members 41 and 43 can of course establish contact with 42 and 44 (same group, CUG 4) but, as they also belong to CUG 9, contact is also allowed with 91 and 92 and with 101 and 102. The members 42 and 44, who only belong to group CUG 4, are only allowed to have contact with everybody within this group. In a corresponding way, contacts between all members of group CUG 9 (91, 92, 41, 43, 101 and 102) are of course possible.

Figure 2:
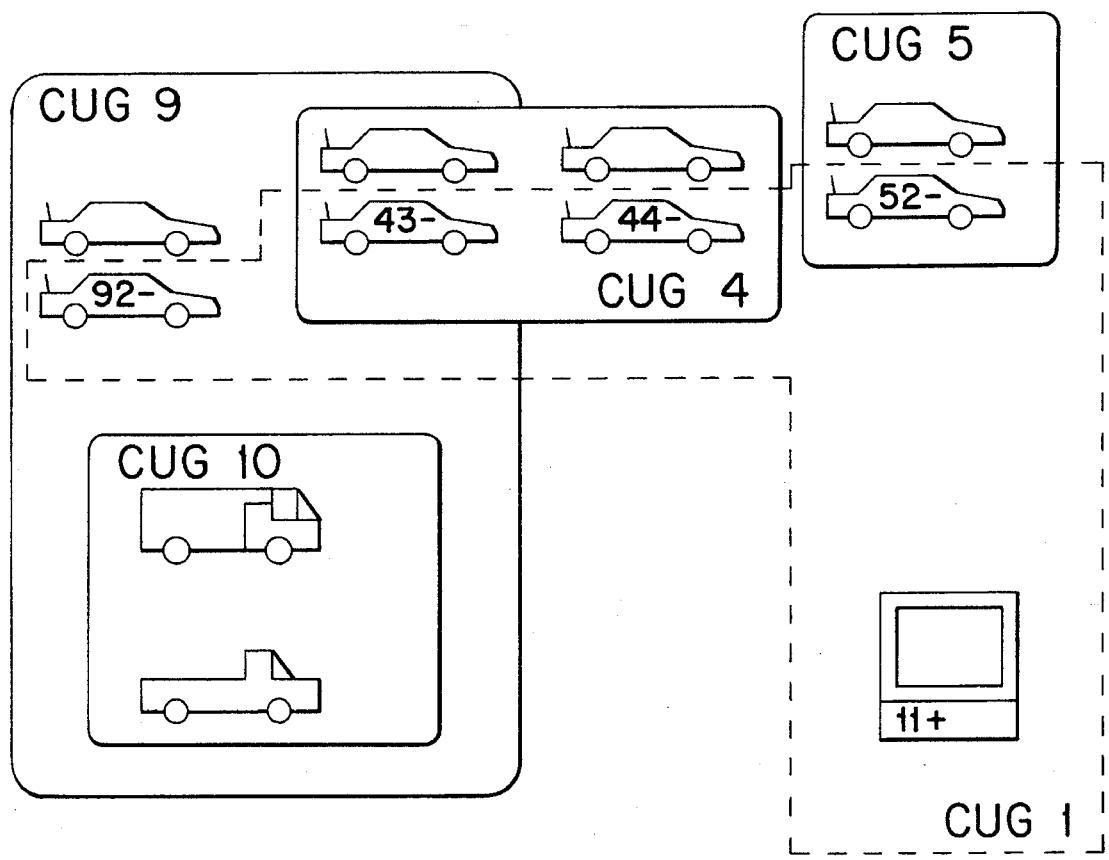

In FIG. 2 the same group structure as in FIG. 1 is to be found. A special closed user group CUG 1 with one user (11) who does not belong to any of the other groups of the example, has however been added. This user, which may be assumed to be a public service, is assumed in the following to belong to one category of users, although the other members (92, 43, 44 and 52) of the group belong to one or more other categories.

If no special precautions are taken it should thus be possible for all the group members to have communication with each other—since at least one member from each of groups CUG4, CUG5, and CUG9 belongs to the same group, CUG 1. This can, however, be avoided if the group members are provided with an additional identity. In order to achieve the object of the .invention this identity only need include two different values. In the example positive (+) and negative (−) "polarity" (identity) have been used. The group CUG 1 can therefore be said to be a "polarized closed user group".

The public service 11 is given "positive" polarity while the other group members are given "negative" polarity. The polarity has been designated in FIG. 2 with + and − after the designations mentioned earlier. When a connection is to be established between two parties, the data transferring network also checks the polarity of the parties. The network is then controlled so that it only allows traffic within the group CUG 1 to be transmitted between parties with opposite polarity. All group members can thus get into contact with the public service 11 (and vice versa) whereas it is not possible to establish communication within the group CUG 1 between, for example, 44− and 52− as these two have the same (negative) polarity. Although the users 92− and 43− both have negative polarity they can of course still establish contact, but this contact is established within the group CUG 9 which is not a polarized group and which therefore takes no account of the polarity of the group members.

Figure 3:
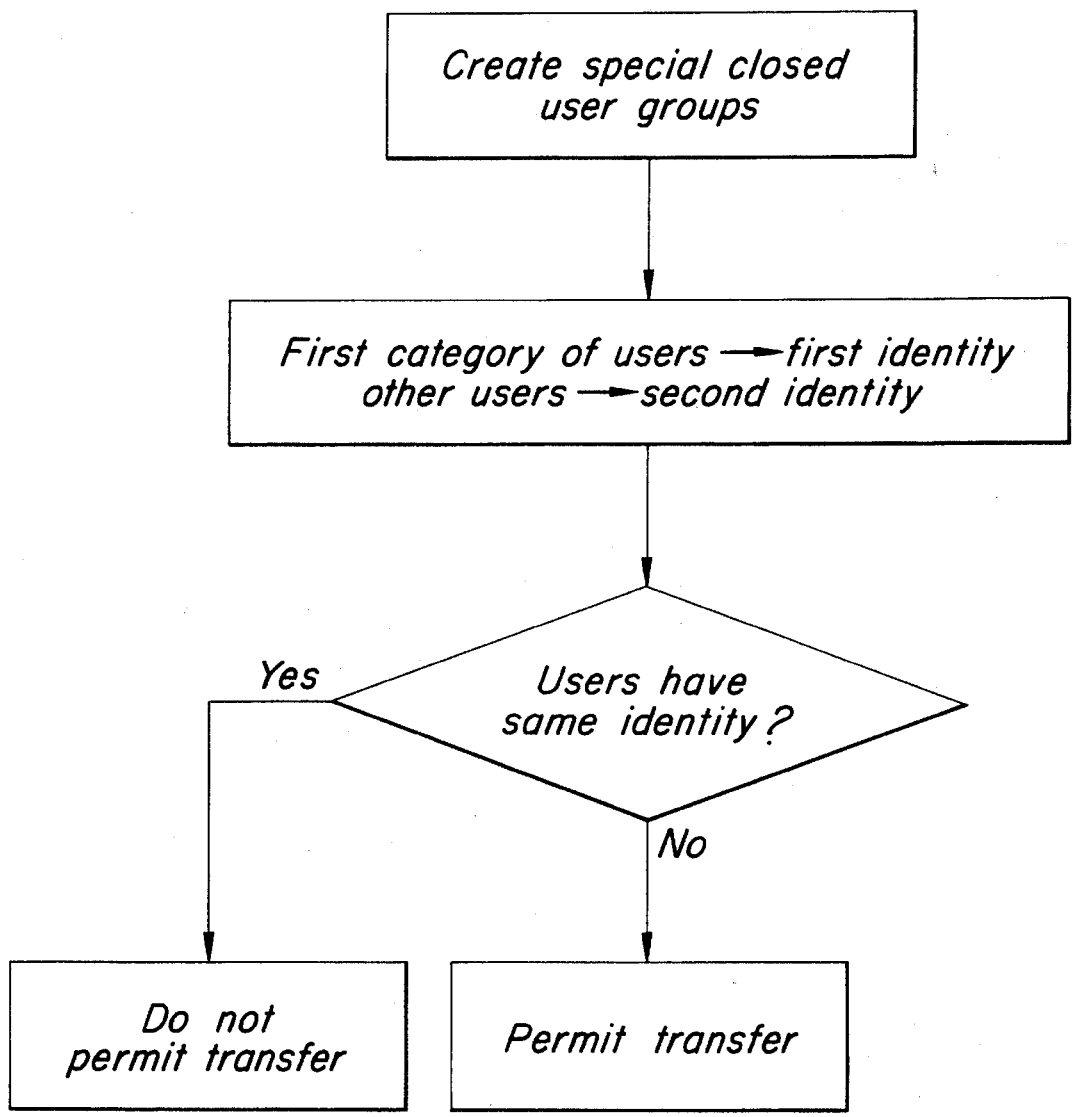
FIG. 3 shows a method of transferring data according to the present invention.

FIG. 3 shows generally a method of transferring data as described above with regard to FIG. 2.

The invention as described above should be regarded as an embodiment of its application. Although the embodiment primarily relates to a network with mobile users/terminals, the invention is not limited to such a network. As is evident from the example there is nothing in the inventive idea which is dependent on the type of data network, transmission method, size of network etc.

In the embodiment the invention has also been applied to a network where one of the user categories only includes one public service. However, nothing prevents its application to networks where this category includes a number of different users. Every such user will in this case be part of a special ("polarized") closed user group.

Further, the invention is not limited to the fact that the additional identity only includes two different values. By using a larger number of identities, for example, different combinations of possible connections can be established between various categories of users and user groups.

What is claimed is:

1. In a data network having a number of closed user groups, a method of controlling information transfer between a first category of users and a group of other users, wherein the users of the first category belong to the data network and the other users belong to any of the number of closed user groups and are of a category different from the first category, the method comprising the steps of:

creating a special closed user group, wherein the special closed user group includes the first category of users and the group of other users, and each such user has an identifier that comprises a first part and a second part;

allocating, to the second parts of the identifiers of the first category of users, a first identity in the special closed user group;

allocating, to the second parts of the identifiers of the other users, a second identity in the special closed user group, wherein the second identity is different from the first identity; and permitting the data network to transfer information between two users in the special closed user group only when the second parts of the respective identifiers of the two users have different identities.

2. The method of claim 1, wherein the first category of users includes public services.

3. The method of claim 1, wherein information is transferred in the data network as data packets.

* * * * *